United States Patent [19] [11] Patent Number: 4,974,182
Tank [45] Date of Patent: Nov. 27, 1990

[54] METHOD AND SYSTEM FOR OPTICALLY MEASURING SIMULTANEOUSLY THE EMISSIVITY AND TEMPERATURE OF OBJECTS

[75] Inventor: Volker Tank, Eching, Fed. Rep. of Germany

[73] Assignee: Deutsche Forschungs- und Versuchsanstalt Fuer Luft- und Raumfahrt E.V., Bonn, Fed. Rep. of Germany

[21] Appl. No.: 378,483

[22] Filed: Jul. 11, 1989

Related U.S. Application Data

[63] Continuation of Ser. No. 18,277, Feb. 24, 1987, abandoned, which is a continuation-in-part of Ser. No. 674,837, Nov. 26, 1984, abandoned.

[30] Foreign Application Priority Data

Nov. 28, 1983 [DE] Fed. Rep. of Germany ....... 3343043
Apr. 19, 1984 [DE] Fed. Rep. of Germany ....... 3414984

[51] Int. Cl.$^5$ ............................................. G01N 21/00
[52] U.S. Cl. .................................... 364/557; 250/339; 250/341; 364/550; 374/9; 374/126
[58] Field of Search .................. 250/339, 341; 356/43; 364/550, 557; 374/9, 121, 126, 130, 142

[56] References Cited

U.S. PATENT DOCUMENTS

| | | | |
|---|---|---|---|
| 3,069,893 | 12/1962 | Kerstetter | 250/341 X |
| 3,492,869 | 2/1970 | Toyota et al. | 374/126 |
| 3,796,099 | 3/1974 | Shimotsuma | 374/9 X |
| 4,172,383 | 10/1979 | Iuchi | 374/9 |
| 4,417,822 | 11/1983 | Stein et al. | 374/126 X |
| 4,465,382 | 8/1984 | Iuchi et al. | 374/9 |
| 4,496,839 | 1/1985 | Bernstein et al. | 250/341 |
| 4,541,059 | 9/1985 | Toshihiko | 364/550 X |
| 4,611,930 | 9/1986 | Stein | 374/121 X |
| 4,645,358 | 2/1987 | Blume | 374/9 |
| 4,708,493 | 11/1987 | Stein | 250/341 X |
| 4,821,219 | 4/1989 | Kienitz et al. | 374/9 X |
| 4,840,496 | 6/1989 | Elleman et al. | 356/43 X |
| 4,880,314 | 11/1989 | Kienitz et al. | 374/126 X |
| 4,924,478 | 5/1990 | Tank | 364/557 X |

Primary Examiner—Parshotam S. Lall
Assistant Examiner—Edward R. Cosimano
Attorney, Agent, or Firm—Browdy and Neimark

[57] ABSTRACT

A system and method for optically measuring simultaneously the emissivity and temperature of an object and the ambient temperature with a successive determination of values of spectral radiance or spectral radiant intensity in n wavelength bands in the visible and/or infrared radiation bands and with m temperatures of the object, by obtaining m rows of at least n=4 values of spectral radiance or spectral radiant intensity from the measurements of at least m=3 different temperatures of the object, forming from the rows a set of equations with n·m=12 unknowns and n·m measured values, expressing through a set of equations $$L1_{M,\lambda i} = t_{QST_r} r_i t_i \{\epsilon_i L_{TOBj,\lambda i} + (1-\epsilon_i)(L_{TAmb,\lambda} + r_{QST_r}\Omega_Q L_{TQ1,\lambda i})\}$$

$$L2_{M,\lambda i} = t_{QST_r} r_i t_i \{\epsilon_i L_{TOBj,\lambda i} + (1-\epsilon_i)(L_{TAmb,\lambda i} + r_{QST_r}\Omega_Q L_{TQ2,\lambda i})\}$$

the measured values with the aid of the Planck radiation law as sum of the spectral radiance or spectral radiant intensity of a radiation source with the temperature, the spectral emissivity ($\epsilon_i$) of the object, and the spectral radiance or spectral radiant intensity of a radiation source of ambient influences with the ambient temperature which is reflected by the object with the spectral reflectivity of the object ($\rho_i = 1 - \epsilon_i$) [unity minus spectral emissivity] at n measuring wavelengths ($\lambda_i$), multiplying the sum with a product ($r_i \cdot t_i$) of the spectral sensitivity ($r_i$) of the measuring object and the transmission ($t_i$) of the atmosphere wtih determining the product also at the n measuring wavelengths $\lambda_i$ (i = 1, ..., n), and solving the set of n·m equations iteratively to determine simultaneously the m different object temperatures, the n different values of spectral emissivity of the object, the ambient temperature, and the n different values of the product ($r_i \cdot t_i$).

9 Claims, 7 Drawing Sheets

METHOD AND SYSTEM FOR OPTICALLY MEASURING SIMULTANEOUSLY THE EMISSIVITY AND TEMPERATURE OF OBJECTS

BACKGROUND OF THE INVENTION

This is a continuation of application Ser. No. 018,277 filed Feb. 4, 1987, now abandoned which is a continuation-in-part of application Ser. No. 674,837 filed Nov. 26, 1984, now abandoned.

The present invention relates to a method and system for optically measuring simultaneously the emissivity and temperature of an object.

All objects emit radiation at temperatures above absolute zero. At low temperatures, the emission peaks in the infrared band. At higher temperatures, the emission shifts toward shorter wavelengths, peaking in the visible spectrum at temperatures approaching that of the sun. Conventional radiometers used for temperature measurements intercept thermal radiation emitted from a radiant source; a calibrated thermopile or photodetector responds to the intercepted radiation, producing an electrical signal which is a measure of the temperature of the radiant source. Radiometric temperature measuring devices are reasonably accurate only under idealized conditions. The characteristics of thermal radiation emitted by a radiant source depend, however, not only upon the temperature of the source, but also on the emissivity of the source's surface. Accurate temperature measurement by radiometric techniques necessitates either knowing or measuring the emissivity, which itself is a function of temperature and wavelength.

The measurement of the surface temperature of natural or artificial objects can be performed for the infrared and visible spectrum bands. A two-beam interferometer, such as a Michelson interferometer is used, for Fourier spectroscopy, particularly for the measuring of radiation of remote objects. Its basic components comprise a beam splitter arranged in the path of the source beam, a first reflector, a second reflector, and a detector system for recording the measured radiation.

Two-beam interferometers were traditionally used for exact linear measurements wherein the unknown mechanical lift of the moving reflector is measured with the help of the known, quasimonochromatic measured radiation in the interferometer. The measuring task is to determine the unknown spectrum of the source radiation fed into the interferometer on the basis of the exactly known movement profile of the moving reflector (Fourier spectroscopy). Fourier spectroscopy as a means for the spectroscopic analysis of unknown radiation was only introduced into metrology at the beginning of the 1960's, when developments in electronic data processing made available, for the first time, computers which could numerically evaluate interferograms. For Fourier spectroscopy, the radiation to be investigated is fed into a two-beam interferometer, for example, a Michelson interferometer, where it is split into two bundles by means of a semi-penetrable beam splitter. After being reflected back by two mirrors, the beams are superimposed and brought to interference. One of the two mirrors is moved in the direction of the radiation by a suitable mechanical drive, whereby the intensity fluctuation of the central spot in the interference pattern is recorded as a function of the position of the movable mirror. The interferogram obtained in this manner is the Fourier transformation of the energy spectrum, i.e., the radiation intensity as a function of the wavelength of the interfering radiation. Fourier spectroscopy is used for recording emission spectra as well as absorption spectra.

In the present invention, two or more radiation measurements, such as the object temperature, the emissivity of the object, and the ambient temperature, can be determined analytically in a limited spectrum, as disclosed, for example, in German patent application No. P 33 21 874.9. The disadvantage of this method is that when measurements are made in n spectral bands, then n equations, independent of one another, exist in the following form:

$$L_{M,\lambda i} = \epsilon_i L_{TObj,\lambda i} + (1-\epsilon_i) L_{TAmb, \lambda i} \quad (1)$$

wherein $L_{M,\lambda i}$ is the measured spectral radiance wavelength $\lambda_i$;

$L_{TObj,\lambda i}$ is the radiation computed in accordance with Planck's law of a black body of a temperature $T_{Obj}$ at wavelength $\lambda_i$;

$\epsilon_i$ is the emissivity of the object at wavelength $\lambda_i$;

$L_{TAmb,\lambda i}$ is the spectral radiance computed in accordance with Planck of a black body of $T_{Amb}$ at wavelength $\lambda_i$;

$(1-\epsilon_i)$ is the reflectivity of the object at wavelength $\lambda_i$;

$T_{Obj}$ is the true object temperature; and $T_{Amb}$ is the true ambient temperature.

Thus, presuming a homogenous ambient temperature and a homogenous object temperature, there are n+2 unknown quantities, namely n unknown spectral values $\epsilon_i$ of emissivity, as well as unknown temperatures $T_{Obj}$ and $T_{Amb}$. Since for n equations there are n+2 unknowns, the system has no solution. The disadvantage of such temperature measurement methods is that simplifying assumptions must be made, which lead to temperature and emissivity values that are not exact. Moreover, measurement errors affect the results.

DESCRIPTION OF PRIOR ART

In general, none of the prior art systems and methods take into account all of the influences from the ambient, the atmosphere, the object and the measuring instruments.

In U.S. Pat. No. 3,069,893 to Kerstetter, there is disclosed a device to determine thermal emissivity using contact sensors rather than optical sensing. In U.S. Pat. No. 3,492,869 to Toyota, there is also disclosed a device for surface temperature measurement, requiring a direct contact measurement. In U.S. Pat. No. 3,796,099 to Shimotsuma et al, there is disclosed a device to measure the surface temperature of a metal object requiring measurement of the cold portion of an object. In U.S. Pat. No. 4,172,383 to Iuchi, there is disclosed a device for also measuring the temperature and emissivity of a heated material that works only for specular reflecting materials, and not for all surfaces. In U.S. Pat. No. 4,417,822 to Stein et al, there is disclosed a laser radiometer which does not take into account the radiation of the environment during the measurement. In U.S. Pat. No. 4,465,382 to Iuchi et al, there is disclosed a device for measuring the temperature and emissivity of a heated material, but one must know both the temperature of the surroundings and of the furnace.

In U.S. Pat. No. 4,496,839 to Bernstein et al, there is disclosed a device for the remote detection and identification of chemical species having a pulsed laser directed at an unknown chemical mass. This stimulates the mass to re-emit one or more wavelength bands that are non-resonant with the laser. Spectral detection of this re-emitted energy allows comparison with spectra of known species, a system and method which is therefor different from that disclosed in the present application.

SUMMARY OF THE INVENTION

Accordingly, it is an object of the present invention to provide a system and method of measuring without contact the temperature of an object, which avoids the disadvantages of the prior art.

More particularly, it is an object of the present invention to provide a system and method of measuring without contact the emissivity and temperature of an object.

Moreover, it is an object of the present invention to allow not only exact determination of the object temperature, spectral emissivity values, and the ambient temperature (or ambient temperatures within a thermally inhomogenous environment) without simplifying assumptions, but also to provide for compensation of different measurement errors.

Accordingly, one feature of the present invention resides briefly stated in a method of measuring without contact the emissivity and temperature of an object with consecutive detection of radiation intensities in n wavelength spectral bands in the visible and/or infrared bands. These radiation measurements in n spectral bands are performed with m different temperatures of the object. It is a feature of the present invention, that while these measurements of the object are taken, the object is either heated or cooled to different temperatures, if it does not change its temperature by itself.

Then, from m rows of each of at least $n=4$ values of radiation intensities from the measurements which are taken of at least $m=3$ different temperatures of the object (O) a set of equations of $n \cdot m = 12$ or less unknowns and $n \cdot m = 12$ measuring values is formed. There, the measured values are expressed by the set of equations with the aid of the Planck radiation law as the sum of the radiant intensity of a radiation source with the temperature and the spectral emissivity ($\epsilon_i$) of the object, and the radiant intensity of a radiation source with the temperature of the environment which is reflected by the object with a spectral reflectivity of the object ($\rho_i = 1 - \epsilon_i$) (one minus spectral emissivity) at the respective n measuring wavelengths ($\lambda_i$). Furthermore, this sum is multiplied with a product ($r_i \cdot t_i$), the spectral response ($r_i$) of the measuring instrument and the transmission ($t_i$) of the atmosphere, which product is obtained at the n measuring wavelengths $\lambda_i$ (where $i = 1, \ldots, n$). In this set of $n \cdot m = 12$ (or more) equations are therefor $n \cdot m = 12$ (or less) unknown quantities, i.e.: three different temperatures of the object, four values of the spectral emissivity $\epsilon_i$ of the object, and four different values of the product $r_i \cdot t_i$, the temperature of the environment of the object under measurement.

It is therefore an object of the invention to solve this system of equations to obtain all the unknown quantities, especially the temperature of the object under measurement.

It is a further object of the invention to provide a method and an arrangement for measuring the emissivity and independent radiation temperature of an object using an equation system, without the necessity of changing the object's temperature, or the ambient temperature, or other values independent of the arrangement used.

In the invention, the radiation of a number of m ($m \geq 1$) of radiation sources (Q1-Qm) is consecutively directed through an optical system (QST, T) onto the object (O), the radiation of these sources reflected from the object together with the radiation emitted by the object and the ambient radiation reflected on the object is detected in n spectral bands ($n \geq 3$). From these measurements, a set of equations $n \cdot (m+1)$ is formed in which the measuring values are expressed, with the aid of the Planck radiation law, as the sum of the radiant intensity of a radiation source with the temperature and spectral emissivity ($\epsilon_i$) of the object (O), the radiant intensity of a radiation source with the ambient temperature, and the radiant intensity of a further radiation source with the temperature of the respective radiation source (Q1-Qm) used for irradiating the object. Both the latter radiant intensities are reflected by the object (O) with the spectral reflectivity ($\rho_i = 1 - \epsilon_i$) of the object.

In this set of equations, the following are unknown quantities:

the temperature of the object,
n values of spectral emissivity of the object,
the ambient temperature, and
m different temperatures of the radiation sources.

It is therefore an object of the present invention to solve this set of equations and obtain a solution that determines the unknown quantities and especially the temperature of the object being measured.

The present invention includes a telescope and a spectral measuring device which provides, via a timing logic circuit, clock pulses to an analog-to-digital converter connected to a microcomputer with a command input, and an indicator. The spectral measuring device (IFS), the m($m \geq 1$) of radiation sources (Q1-Qm) are arranged, and a beam splitter (QST) is provided between telescope (T) and spectral measuring device (IFS), where the radiation of one of m radiation sources (Q1-Qm) is directed onto object (O) and viewed by the telescope.

The method in accordance with the present invention makes use of the following equations:

$$L1_{M,\lambda i} = r_i \cdot t_i \{\epsilon_i \cdot L_{T1Obj,\lambda i} + (1 - \epsilon_i) L_{TAmb,\lambda i}\} \quad (2)$$

$$L2_{M,\epsilon i} = r_i \cdot t_i \{\epsilon_i \cdot L_{T2Obj,\lambda i} + (1 - \epsilon_i) L_{TAmb,\lambda i}\} \quad (3)$$

for $i = 3, \ldots, n$
wherein $L1_{M,\lambda i}$ is the measured radiation at wavelength $\lambda_i$ (center wavelength) and at object temperature T1;
$L2_{M,\epsilon i}$ is the measured radiation at wavelength $\lambda_i$ and object temperature T2;
$r_i$ is the spectral sensitivity of the measuring device at wavelength $\lambda_i$;
$t_i$ is the transmission of the atmosphere at wavelength $\lambda_i$;
$T1_{Obj}$ is the object temperature T1; and
$T2_{Obj}$ is the object temperature T2.
Where:

$$L_{T1Obj} = \frac{c_1}{\pi \lambda^5} \cdot \frac{1}{e^{\lambda \cdot T1Obj} - 1} \quad (4)$$

wherein $c_1 = 3.7418$ [W cm² μm⁴];
$c_2 = 1.4388$ [μm K];
$\pi = 3.141843$ $L_{T1Obj}$ is the radiation in accordance with Planck's law for a black body of temperature $T1_{Obj}$;
$\lambda$ is the wavelength [μm]; and
$T1_{Obj}$ is the object temperature T1 [K].

Equation (4) is also valid for $T2_{Obj}$. Equations (2) and (3) define the radiation which is measured from natural objects, namely the sum of detected radiation which is dependent on the surface temperature, the spectral emissivity of the ambient temperature, and the reflectivity $\rho_i = 1 - \epsilon_i$ of the object.

If an object has a temperature $T1_{Obj}$ and only the center wavelength $\lambda_i$ of the used spectral measuring device is known (and the width of all spectral bands is identical), then equation (2) for n particular regions contains the unknown factors:

$T1_{Obj}, T_{Amb}, r_i \cdot t_i$ and $\lambda_i$.

Thus, there are 2n+2 unknown factors. It will be presumed that the factors $r_i$ (the spectral sensitivity of the measuring device) and $t_i$ (the transmission degree of the atmosphere) must be determined only as the product as they appear, and the knowledge of their individual values are not of interest.

The 2n+2 unknowns are compared with equation (2) by only n measuring values. The exact solution of this system of equations is not possible. If the object changes its temperature to value $T2_{Obj}$, then equation (3) is also valid. While only one additional unknown, namely $T2_{Obj}$, is added, n further measuring values are added. Thus, 2n measuring values are opposed by 2n+3 unknowns, so that this system of equations also cannot be solved exactly. If the object changes its temperature to $T3_{Obj}$, then there are 2n+4 unknowns as compared to 3n measuring values. In other words, for n=4 spectral bands, a system with 12 measured values and 12 unknowns becomes exactly solvable (wherein "exact" means that the measurements are error-free). When the measurements are conducted in n=5 spectral regions, then the set of equations is provided with 15 measurements and 14 unknowns. The solution is performed iteratively (by a balancing computation), with redundancy in the determination so that measurement inaccuracies can be compensated for.

The difference in the number of values that can be measured, and the number of unknowns 3n−(2n+4)=n−4 shows that the number of the measured values which add to the number of the measured values required for solution is high, these additional values serving to compensate for measuring inaccuracies.

The above calculations are valid only when during the time of the measurements $r_i$, $t_i$ and $T_{Amb}$ are held constant, which is guaranteed when the measuring system and environment are unchanged, when the time gaps between the measurements are short, and when $\epsilon_i$ for $T1_{Obj}$, $T2_{Obj}$ and $T3_{Obj}$ has the same value, a requirement which is satisfied for wide temperature bands for the majority of materials and objects. The emissivity becomes distinct and temperature dependent only for high temperatures (glow) and where there is a change in state of the aggregation.

To perform the method, the spectral radiation of the object is measured for three different object temperatures. For example, in n=4 spectral bands, and from these 12 measured values, 12 unknown quantities can be determined exactly. If n>4, there are n−4 measured values which contribute by compensating measurement inaccuracies to the accuracy of the results.

It is, of course, possible to calibrate the spectrometer in a known manner, or to determine its spectral sensitivity $r_i$ with the aid of calibration sources such as black bodies, and additionally to select its spectral bands so that they lie in the regions of high atmospheric transmission $t_i$, so that ti=1 can be set. Such regions can be obtained in a known manner by measurement or model computation, such as with the aid of the "LOWTRAN" and "HITRAN" models for measuring range. Thus, the number of unknown values is reduced to n+2, so that by measuring two (2) temperatures of the object to obtain 2n measured values for n=2, there are 4 unknowns and 4 measured values. Thus, a solution is possible, and for n>2, a number of n−2 measured values provides for compensation.

It is also possible to use all of the recovered results in following measuring steps. If, for example, a temperature region is found in which the emissivity is temperature independent, then the determined spectral emissivity $\epsilon_i$ can be used as known in the following measurements. In other words, as long as the object temperature lies within the predetermined region, each spectral measurement can be used balancingly at only one temperature of the object to determine the object's temperature and the ambient temperature. This is also true for the spectral sensitivity $r_i$ of the spectrometer, and the transmission $t_i$ of the atmosphere (which both are temperature-independent). When, for example, these values ($\epsilon_i$, $t_i$, $r_i$) are determined with n=4 and from 3n=12 measured values, it is possible in the further step to have n=4 measured values to balance and determine the two unknowns $T_{Obj}$ and $T_{Amb}$. It is therefore possible for many applications to measure the object only once, or only after long time intervals for control purposes, at several temperatures (which is attainable by artificial heating) and use the thus obtained values, for example, for monitoring during long time periods).

With the invention method, it is not only possible to determine exactly the temperature of an object, but also its spectral emissivity and the ambient temperature. Moreover, from the radiation measurement of the objects without a special calibration, one can also determine the influence of the spectral sensitivity of the device and the atmosphere. The method is thus "self-calibrating", and a drift of the spectral sensitivity of the measuring device does not distort the results. Thereby, the device need not be calibrated and post-calibrated, an invaluable advantage for routinely used measuring devices.

A further advantage of the inventive method is that with a high number of spectral bands and/or object temperatures, inaccuracies in the resultant measurements are compensated.

In a preferred embodiment of the invention, m(m≧1) radiation sources are possible where, for example, m blackbodies are heated to m different temperatures and thereby have m different intensities. With the aid of a corresponding optical and mechanical system, the radiation of each of the m radiation sources is directed successively onto the object and where advantageously this radiation completely illuminates both the angular region of the spectrometer used, and also the surface of the object viewed by the spectrometer. In other words, the viewing angle of the inventive illuminating arrangement is equal to or greater than that of the spectrometer.

The radiation sources shall correspond to the spectral ranges of the measurement. In other words, for both the infrared and visible bands, the black body source, such as a cavity source can be used. Moreover, tungsten filament lamps or quartz iodine lamps and the like can be used. In the ultraviolet region, arc lamps can be used. For all spectral bands, lasers or laser diodes are especially suitable.

Other objects and features of the present invention will become apparent from the following detailed description when taken in connection with the accompanying drawings which disclose a few embodiments of the invention.

BRIEF DESCRIPTION OF THE DRAWINGS

In the drawings, wherein similar reference characters denote similar elements throughout the several views.

DESCRIPTION OF PREFERRED EMBODIMENTS

Figure 1:
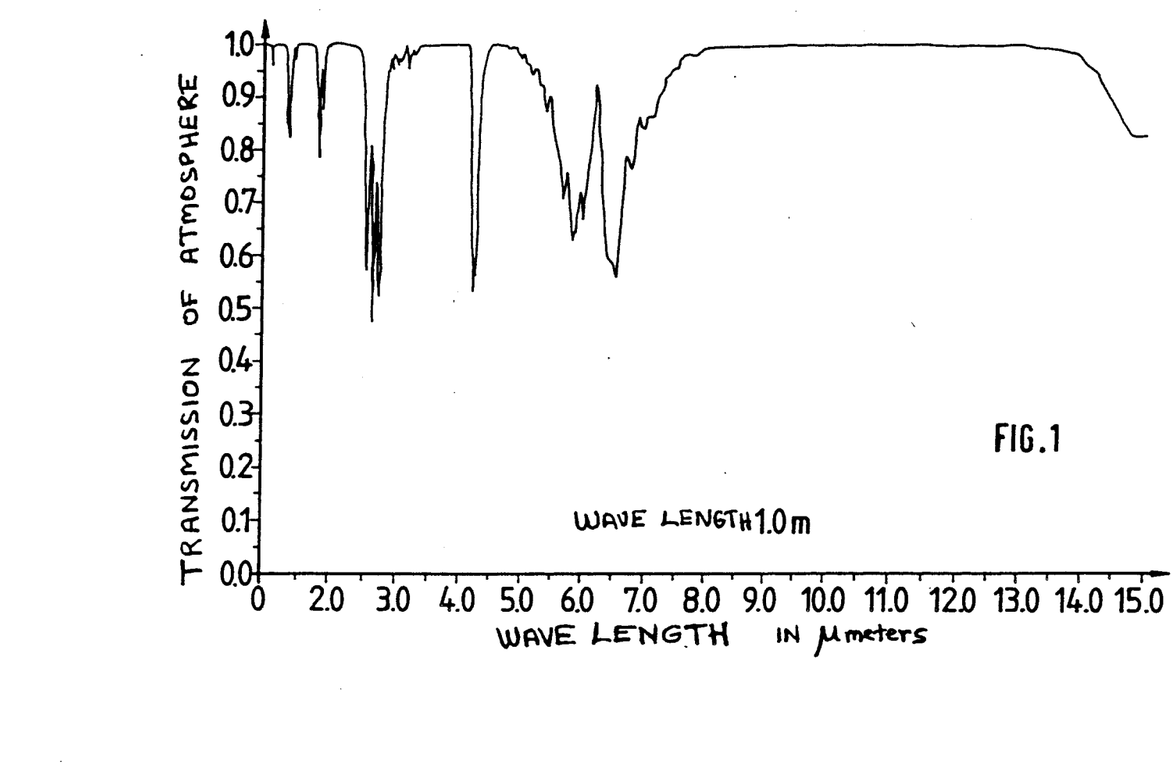
FIGS. 1 and 2 are graphs showing the transmission of the atmosphere with respect to wavelength, for path lengths of 1 m and 3 m, computed with the model "LOWTRAN 5" with the use of the model "Mid latitude summer", with a spectral resolution of 5 cm$^{-1}$ at a height of 0.5 km, and with a visual range of 23 km.
Figure 2:
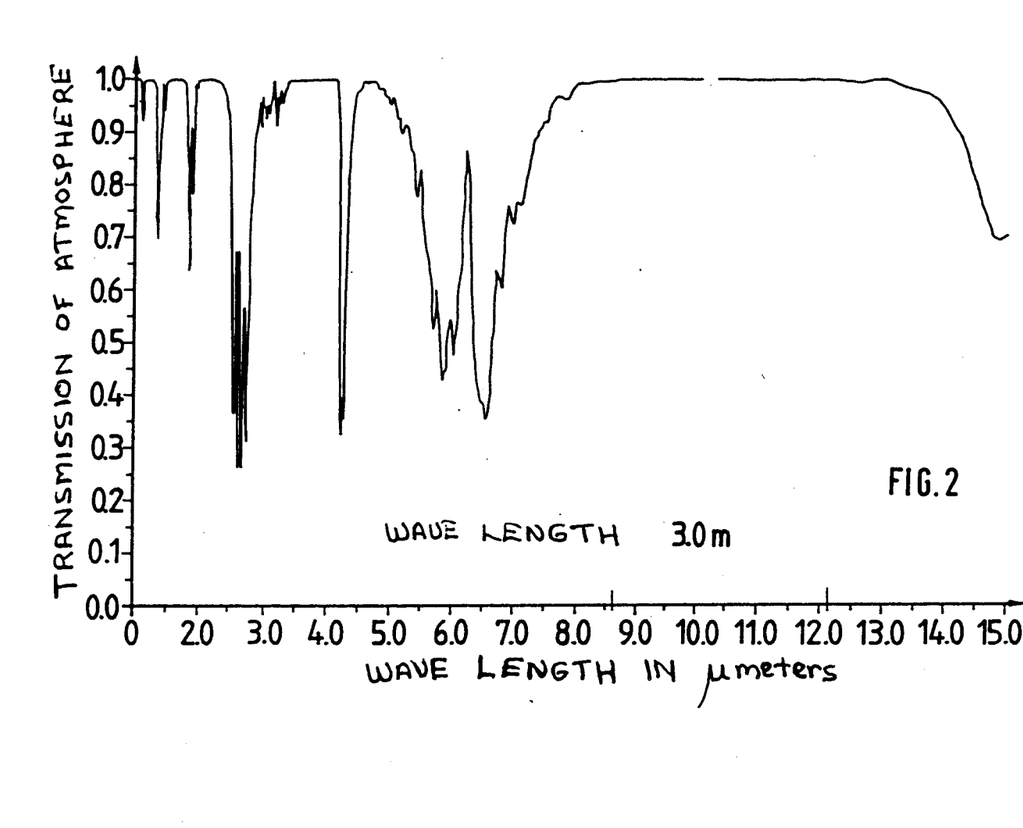

Referring to FIGS. 1 and 2, there is shown graphs illustrating the transmission of the atmosphere for wavelengths of between 1 μm to 15 μm. The invention is not limited to this wavelength range, but also can be used in the ultraviolet band continuously to the long wave infrared range, up to millimeter wavelengths. The region shown in FIGS. 1 and 2 including the nonvisible spectral region is especially suitable for carrying out the method of the invention, with naturally or artificially obtained ambient temperatures including industrial processes. Of course, for distance lengths of 1 m to 3 m in the visible spectrum, the transmission of the atmosphere is equal to $t_i = 1$.

To perform the method of the present invention, spectral bands are selected for energy considerations in which the transmission of the atmosphere is close to $t_i = 1$. The entire region shown in FIGS. 1 and 2 is suitable. For greater distance lengths, the transmission of the atmosphere in certain regions (for example, substantially from 2.6 μm to 2.8 μm, or substantially 5.5 μm to 7.3 μm, etc.) is equal to zero ($t_i = 0$). Measuring within these bands is, of course, not useful. However, with such measurements, other variables can be determined when radiant energy arrives from the object to the measuring device, as long as the number of the unknowns is equal to or smaller than the number of the measured variables.

Figure 3:
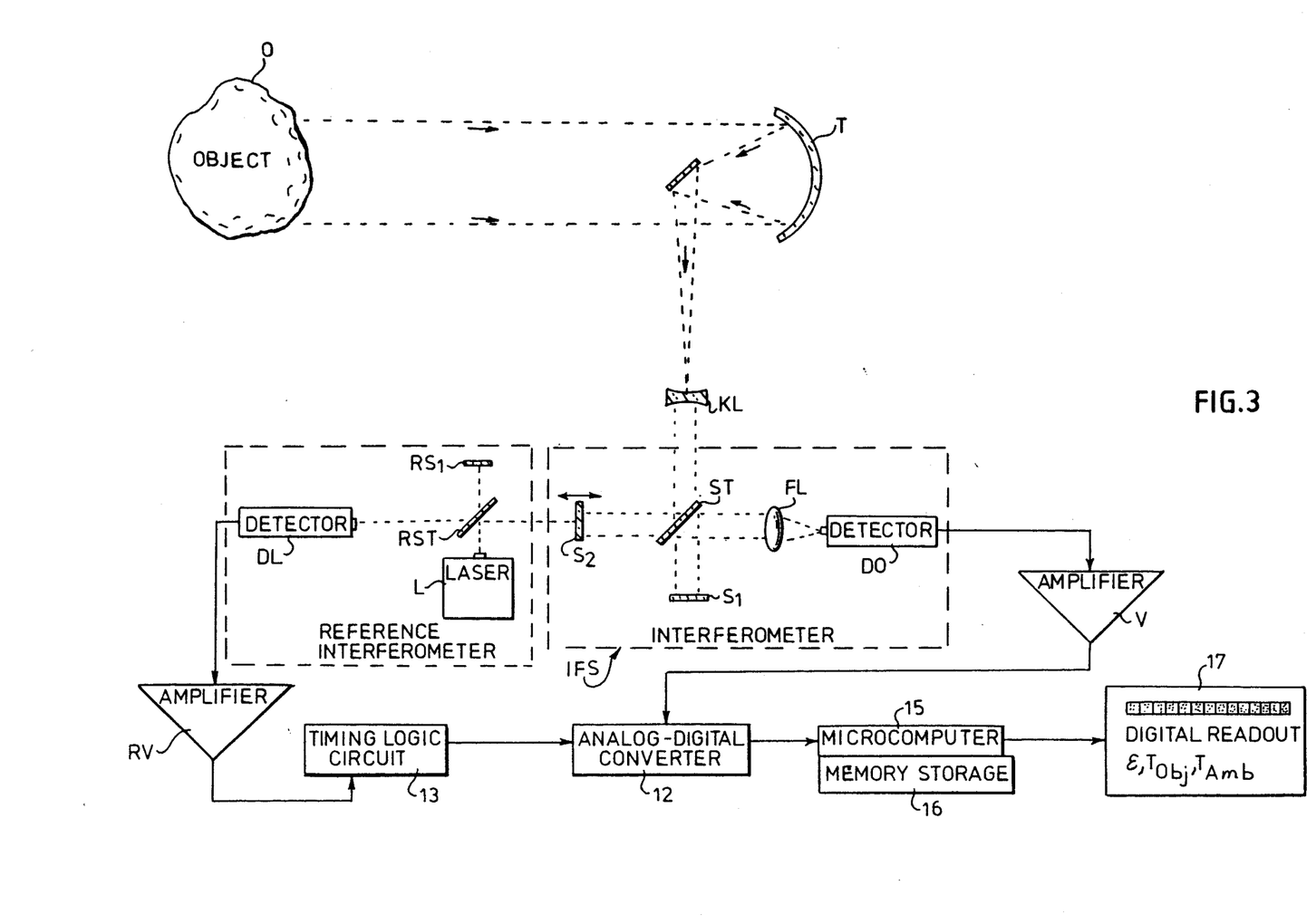
FIG. 3 is a schematic diagram showing an apparatus for measuring the temperature of an object according to the present invention.

In the embodiment shown in FIG. 3, radiation from an object O is collected by a telescope T of an interferometer spectrometer IFS (an interferometer of Michelson's type) and directed via a collimator lens KL into the interferometer. In interferometer IFS, an interferogram is created of the received radiation with the aid of a beam splitter ST, a fixed mirror S$_1$ and a movable mirror S$_2$, and a field lens FL focused on a detector DO. The interferogram, in the form of an electrical signal appearing at the output of detector DO is fed into an electrical amplifier V. From the output of amplifier V, the signal is then digitized in an analog-to-digital converter 12 with the aid of a converter pulse from timing logic circuit 13. Logic circuit 13 produces connector pulses in response to optical pulses from a further fixed mirror RS$_1$, a further beam splitter RST of a reference interferometer, a further detector DL of the reference interferometer and an output amplifier RV, and from the laser light of a laser L (for example, an HeNe-laser) used in the reference interferometer for measuring the position of movable mirror S$_2$.

The digitized measuring values (interferogram values) are computed either directly by a microprocessor 15 through a mathematical Fourier transformation into the spectrum of the received radiation and then stored as spectrum value in a digital memory storage 16 coupled to microprocessor 15, or first supplied to this storage and later transformed. Similar measurements are performed after the object changes temperature, or the ambient temperature changes. After all corresponding spectra data is computed, depending upon the spectral resolution of the interferometer, depending upon the number of readings taken, the equation system can be calculated and solved. All values obtained, such as the object temperatures, can then be indicated with the aid of an indicating or readout device 17. Microprocessor 15 is connected to a command input unit through which all commands required for the method can be called up, joined, or started in a known manner.

Apart from the embodiment of FIG. 3, it is also possible to use a different spectral radiometer, such as a filter radiometer or a grating spectrometer. It is possible to use any number of spectral bands provided that the equation system can be solved. The storage, processing and feeding of the measured values and the results can be performed on different media and computers. Since, in general, a minimum number of the measured values are required, a microprocessor is sufficient to detect and compute the data, so that the previously described apparatus of the invention can be designed using simple, modern and portable interferometers to broaden the applications of the invention.

Figure 4:
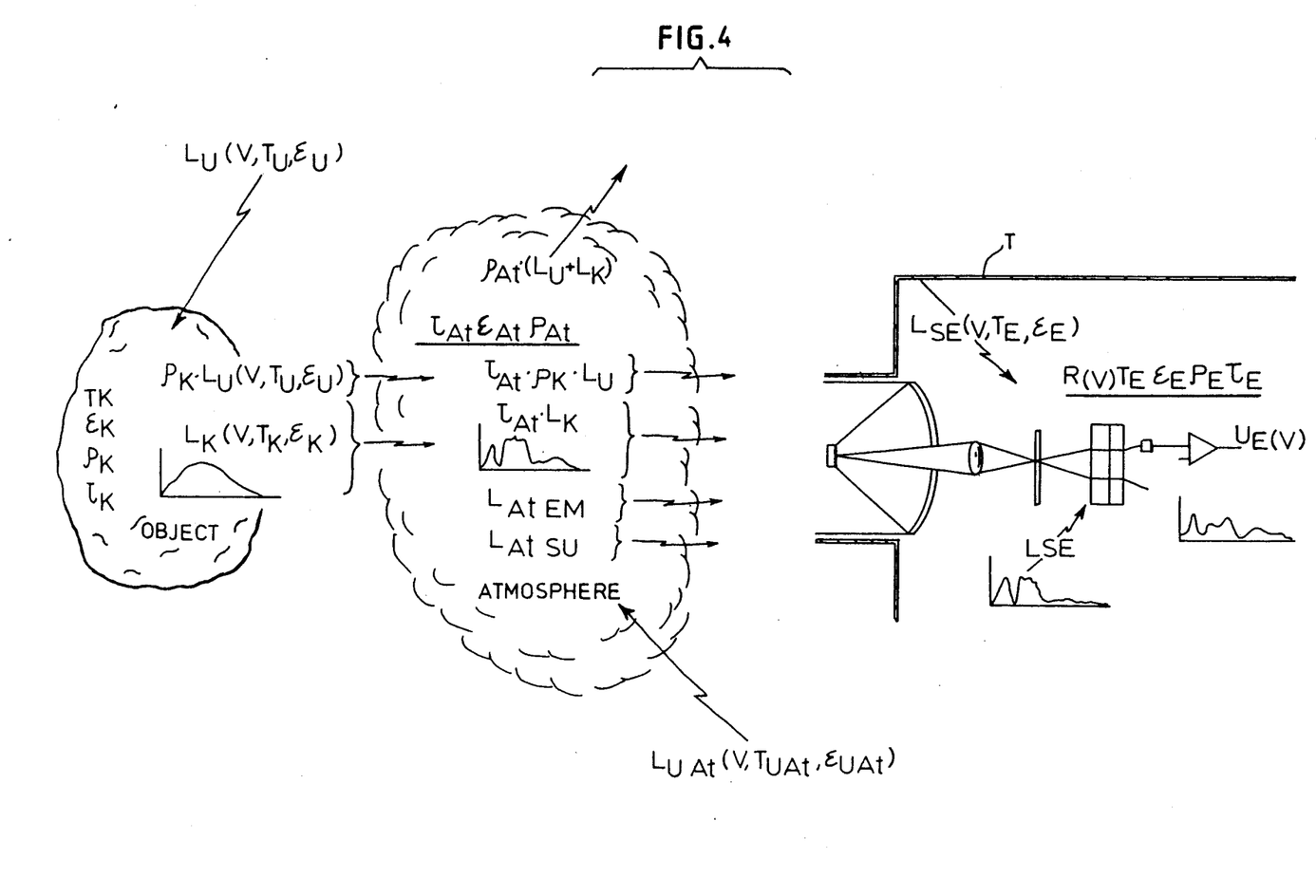
FIG. 4 is a partial schematic diagram illustrating radiation measurement with important radiation contributions.

Referring to FIG. 4, there is shown a schematic diagram illustrating the radiation measurement with the most important radiation components. In FIG. 4:

| | |
|---|---|
| ν | the wavenumber [cm$^{-1}$] (inverse wavelength) related to the ambience of the object: |
| $L_u$ | the radiation of the ambient as a function of ν and: |
| $T_u$ | the ambient temperature |
| $\epsilon_u$ | the value(s) of emissivity of the ambient (which is in turn a function of ν) related to the object: |
| $L_K$ | the radiation of the object as function of ν and: |
| $T_K$ | the object temperature |
| $\epsilon_K$ | the value(s) of emissivity |

-continued

| | | |
|---|---|---|
| $\rho_K$ | further the value(s) of reflectivity and | of the object, which are functions of v; |
| $t_K$ | the value(s) of transmission related to the atmosphere: | of the atmosphere |
| $t_{At}$ | the transmission | which are functions of v. |
| $\epsilon_{At}$ | the emissivity | |
| $\rho_{At}$ | the reflectivity | |
| $L_{AtEM}$ | the radiance of the radiation emitted by the atmosphere, a function of the atmosphere temperature, of v and of $\epsilon_{AT}$ | |
| $L_{AtSu}$ | the radiance of the radiation dispersed in the atmosphere emerging from the object and from the ambient radiation of the atmosphere related to the ambient radiation of the atmosphere (other than of the object): | |
| $L_{uAT}$ | the ambient radiation of the atmosphere, which is function of v, and: | |
| $T_{uAT}$ | the ambient temperature of the atmosphere | |
| $\epsilon_{uAT}$ | the emissivity (of the objects) due to the ambient temperature of the atmosphere related to the measuring device: | |
| $L_{SE}$ | the radiance of the measuring device (radiation receiver) which is a function of v, and | |
| $T_E$ | the temperature of the measuring device | |
| $\epsilon_E$ | the emissivity of the inner surfaces of the measuring device; further: | |
| $\rho_E$ | the reflectivity of the inner components | |
| $\epsilon_E$ | the emissivity | of the inner components |
| $t_E$ | the transmission | of the measuring device |
| $R(v)$ | the spectral responsivity of the measuring device as function of the wavenumber v, wherein the responsivity corresponds to the $r_i$ in the previous equations there as function of the wavelength $\lambda$, and | |
| $U_{E(v)}$ | the electrical signal of the measuring device obtained from the received radiation of the detector, which is function of v. | |

In FIG. 4, the object, ambient, atmosphere and measuring device are denoted, showing where the respective radiation components originate or change. A coordinate system is shown at four places indicating how the spectral characteristics of the object's radiation continuously changes from the object's surface (where the radiation is characterized by the Planck law for $\epsilon_K(v) = $ const.) to the measuring device due to the ambient, atmosphere, and the measuring device.

The object is described by its temperature and its spectral emissivity, reflectivity and transmission. Respective quantities describe also the ambience, surrounding the object. The ambience for the sake of simplicity is considered as spatially homogeneous, whereby the transmission of the object is set to zero. Therefore, $\epsilon_K + \rho_K = 1$, or in other words, when in some cases $t_K \neq 0$, it is accepted that the ambient radiation penetrates the object corresponding to $t_K$ from all sides, and also from the rear side. The outgoing radiation from the object is therefore the sum of the object radiation and the reflected ambient radiation. On the path through the atmosphere, both portions are changed by the spectral transmission of the atmosphere, the radiation emitted from the atmosphere, and the ambient radiation dispersed in the atmosphere. This ambience at least for long paths through the atmosphere is different from the ambience of the object. On the path through the measuring device from the optical system to the detector, further radiation contributions add to the received radiation, namely, the radiation emitted from the inner components, and the inner surfaces of the measuring device are superimposed. Moreover, the radiation is influenced by components, such as filters, lenses, mirror surfaces, etc. of the measuring device as well as by the spectral sensitivity of the detector, if it is not constant in the measuring region. These multiplied influences are concentrated in factor $R(v)$ or $r_i$, whereas all radiation contributions produced by the measuring device are concentrated by (instrument-radiation) radiation $L_{SE}$.

All above described quantities are initially unknown. They, however, can be determined, if radiation measurements are conducted with a sufficiently large number of wavelength regions and with sufficient number of different object temperatures and/or of the ambient radiation so that a defined and redundantly defined equation system is obtained. When the object temperature is to be found, it is advantageous to design the measuring apparatus to disregard as many values as possible which are not useful.

When the measuring device is, for example, an interferometer with a purely reflecting optical system and the temperature of the entire device is stabilized, as a good approximation, one can sum up the different contributions of the device's radiation to a radiance $L_{SE}$, which is determined by temperature $T_E$ of the device. The emissivity $\epsilon_E$ of the inner surfaces of the device is maintained uniform by the continuous use of the same materials. When the measuring task allows, a detector is used whose sensitivity is independent of wavelength. Advantageously, the wavelength region of the measurement is selected so that the transmission of the atmosphere can be set to $t_{AT} = 1$. Moreover, the radiation contribution of the atmosphere $L_{AtSu}$ and $L_{AtEM}$ is also neglectable, in that the path between the measuring device and the object is kept short. In some cases, by respective screening (for example, through a tube at the measuring device which is close to the object), a homogeneous ambient radiation is produced so that only one ambient temperature must be considered.

With the measurement in n wavelength regions with m different object temperatures, the following are unknown:

| | |
|---|---|
| $m \times T_{Obj}$ | the object temperature |
| $m \times \epsilon_i$ | the spectral emissivity of the object |
| $1 \times T_{Amb}$ | the ambient temperature |
| $1 \times T_M$ | the temperature of the measuring device |
| $1 \times r_i = $ constant | (internal) the spectral responsivity of the measuring device, | wherein $n+m+3$ unknown quantities are opposed by $n \cdot m$ measured values. For $m=2$ object temperatures and $n=5$ wavelength regions, a self-calibrating measurement is possible. Of course, in general, an increase of the number m of the object temperatures is more effective than the utilization of more wavelength regions. With the presumption that $r_i$ is not constant and is wavelength dependent, there are n unknown values of $r_i$ or there are $2n+m+2$ unknowns as opposed by $n \cdot m$ measured values, and with $m=3$ and $n=5$, the equation system is determined.

For this example, the emission of the inner surface of the measuring device is accepted as $\epsilon_E = $ const $= 1$. Then, the following equations are valid:

$$L1_{M,\lambda_i} = r_i\{\epsilon_i \cdot L_{T1Obj,\lambda_i} + (1-\epsilon_i)L_{TAmb,\lambda_i} + L_{TE,\lambda_i}\} \quad (5)$$

$$L2_{M,\lambda_i} = r_i\{\epsilon_i \cdot L_{T2Obj,\lambda_i} + (1-\epsilon_i)L_{TAmb,\lambda_i} + L_{TE,\lambda_i}\} \quad (6)$$

$$\begin{matrix} . & . & (.) \\ . & . & (.) \\ . & . & (.) \\ . & . & (.) \end{matrix}$$

The different radiation contributions, of course, have different importance in different wavelength bands. For example, the emissivity and radiation of the instrument in the visible band is neglectable. These explanations are true, in general, and they are especially determined for the infrared band, considered to be the most important for the technical purposes.

The inventive method can also be used for another purpose of lesser importance. When measurements are performed with m object temperatures and with n spectral regions, and no other information is available apart from these measured values, especially when the measurements are performed at n wavelengths, and the wavelengths are only approximately known, such as that they are in the visible band, or 3-5 μm band, or in the 8-14 μm band, then all unknown quantities, particularly the wavelengths themselves of the measurements can be obtained from the calculations.

When, for example, there are n spectral bands of the measurements, n values of spectral emissivity of the object, n values $r_i \cdot t_i$ (the product of spectral sensitivity of the measuring device and the spectral transmission of the atmosphere), m object temperatures, an ambient temperature, and the temperature of the measuring device, are unknown, then there are $3n+m+2$ unknowns as opposed to n·m measured values. Then, for example, for n=6 and m=4, the equation can be solved. For n=6 and m=5, the equation (redundant by 5 measured values) can be determined with redundancy.

For the apparatus of FIG. 4, in order to measure the infrared range, m radiation sources are provided. For example, Q1-Qm black bodies can be disposed in the housing of a spectrometer (not shown). An interferometer-spectrometer IFS, is used in FIG. 5 as in FIG. 3 for this measurement. The m radiation sources in form of black bodies Q1-Qm can be disposed in succession so that the outgoing radiation from each source, when in the proper position, falls on beam splitter QST. It can also be directed to beam splitter QST, with the aid of deflecting mirrors and fixed radiation sources.

Figure 5:
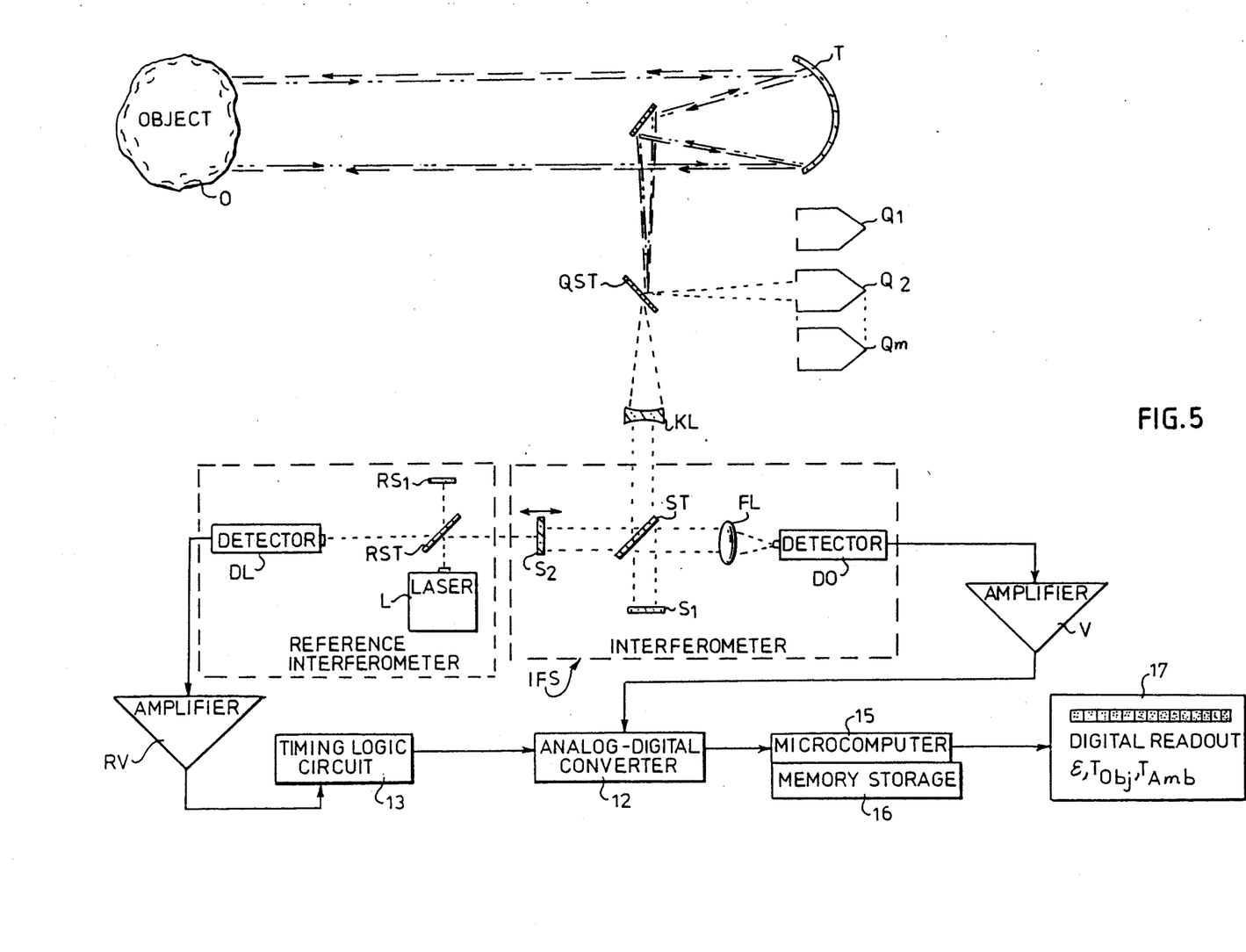
FIG. 5 is a schematic diagram showing an apparatus for measuring the temperature of an object with m radiation sources.

The beam splitter QST operates in a known manner as a partially transparent permeable mirror, reflecting one half of the radiation from radiation source Q via telescope T, onto object O to be measured. The other half of the radiation from source Q passes through beamsplitter QST. By a plain mirror arranged opposite to sources Q1-Qm, on the other side of the beam splitter, the radiation component that passed through the beam splitter can be again directed via beam splitter QST so that half goes to interferometer spectrometer IFS, and half returns to the respective source. Thereby, a definite radiation comes from the rear side of beam splitter QST into the spectrometer, which again can be considered in the equation system.

The radiation which emerges from object O, the radiation of the environment reflected by the object, and the radiation part reflected by object O of radiation sources Q1 to Qm located opposite from the beam splitter are collected by telescope T of interferometer IFS, and directed via beam splitter QST and collimator lens KL to the interferometer. In interferometer IFS, there is obtained an interferogram of the received radiation by beam splitter ST, fixed mirror S1, movable mirror S2, as well as field lens FL with the aid of detector DO.

The interferogram is processed in the same manner as described in respect to the apparatus of FIG. 3. All values determined or individual values such as the object temperature can be measured with the aid of indicating device 17.

In the embodiment shown in FIG. 5, there are provided m (m≧1) radiation sources Q1 to Qm. They heated, for example, for measurement in infrared region to m different temperatures $T_{Q1}$ to $T_{Qm}$, and thus have m different intensities. With the aid of beam splitter QST and the above apparatus, where either m radiation sources in form of Q1-Qm black bodies are moved to beam splitter QST, or the radiation is produced by sequentially disposed black bodies Q1-Qm via respective mechanically controlled deviation mirrors to radiation divider QST, the radiation of each source Q1-Qm is directed via telescope T to object O whose temperature is to be measured. The radiation sources thus correspond to the spectral bands of the measurement so that, for example, the black bodies in the form of cavity sources can be used both in the infrared band and in the visible band, whereas, for example, arc lamps can be used in the ultraviolet band.

When each of the m sources are radiating, then a spectral measurement is performed, resulting in the following set of (m+1)·n equations. Here, n identifies the number of employed spectral bands of the spectrometer. The instrument's radiation of the measuring device is taken as insignificant, but can also be considered.

The (m+1) equations are as follows:

$$L1_{M,\lambda_i} = t_{QST_i} r_i t_i \{\lambda_i \cdot L_{TObj,\lambda_i} + (1-\lambda_i)(L_{TAmb,\lambda_i} + r_{QST_i}\Omega_Q \cdot L_{TQ1,\lambda_i}) \quad (7)$$

$$L2_{M,\lambda_i} = t_{QST_i} r_i t_i \{\lambda_i \cdot L_{TObj,\lambda_i} + (1-\lambda_i)(L_{TAmb,\lambda_i} + r_{QST_i}\Omega_Q \cdot L_{TQ2,\lambda_i}) \quad (8)$$

$$Lm_{M,\lambda_i} = t_{QST_i} r_i t_i \{\lambda_i \cdot L_{TObj,\lambda_i} + (1-\lambda_i)(L_{TAmb,\lambda_i} + r_{QST_i}\Omega_Q \cdot L_{TQm,\lambda_i}) \quad (9)$$

$$L(m+1)_{M,\lambda_i} = r_i t_i \{\lambda_i \cdot L_{TObj,\lambda_i} + (1-\lambda_i) \cdot L_{TAmb,\lambda_i}\} \quad (10)$$

wherein $\Omega_Q$ is the geometry and correction factor of the irradiating source Q, $r_{QST_i}$ resp. $t_{QST_i}$ is a spectral reflectivity resp. transmission of a beam splitter of FIG. 5, and $L1_{M,\lambda_i} \ldots Lm_{M,\lambda_i}$ is the detector signal.

Since the measured values of object O can be taken and used without additional irradiation in equations (7) to (10), it is necessary when using m irradiators to produce (m+1)·n equations to perform a measurement without irradiation. In general, it is sufficient for this measurement to switch off these additional radiation sources. When measuring in the infrared band, especially when using the apparatus of FIG. 5, beam splitter QST should be flipped off the path of the radiation, whereby n further unknowns take place, since $t_{QST_i} r_i t_i$ changes to $r_i \cdot t_i$. Thus, those further n measurements, without irradiation, provide no effect during measurements made with the embodiment of FIG. 5 in the infrared region.

If the inventive apparatus is simply designed to only guarantee that temperatures $T_{Q1}$-$T_{Qm}$ of the number of radiation sources Q1–Qm are different, their exact values cannot, however, be measured or indicated, and further the values $\Omega_Q$ and $r_{QST_i}$ and $t_{QST_i}$ are not exactly known, then the above presented set of equations contains the following unknowns:

$m \times T_Q$ $n \times \epsilon_i$ $n \times t_{QST_i} \cdot r_i \cdot t_i$ $n \times r_{QST_i} \cdot \Omega_Q$ $1 \times T_{Obj}$ $1 \times T_{Amb}$ $n \times r_i \cdot t_i$ when flipping off beam splitter QST is needed.

The value identified as the geometry and correction factor $\Omega_Q$ and the value identified as the spectral sensitivity $r_i$ in equations (7) to (10) will be considered herein since these contain different values. When the respective optical system is used, this spectral measuring device receives radiation only from a predetermined angular region, or in other words, within the field of view or the solid angle. Moreover, the sensitivity of the spectrometer is lower at the edges of its field of view than at its center. All of the parts of the received radiation, namely, from the object, from the ambient and from additional irradiation, undergo the same treatment with respect to the solid angle and the sensitivity over the field of view of the spectrometer. This holds true for the part of the additional irradiation only when one follows the above-described recommendations related to a complete illumination of the surface covered by the spectrometer field of view. The numerical consideration of the field of view angle and its sensitivity can be obtained from value $r_i$. Therefore, value $r_i$ is also identified as the spectral sensitivity of the spectral measuring device. Value $r_i$ takes into account the influence of all optical components of the measuring device, such as lenses, mirrors, beam splitters, and detector, as well as the electronic system.

The geometry and correction factor $\Omega_Q$ will be explained. Since the ambient radiation irradiates the object from the entire hemisphere with the object having a flat surface, the additional irradiation, because of the difference here, is produced only from a smaller region, namely, the solid angle of the irradiating optical system, and a correction value k1 has to be introduced. The correction value k1 is defined as the ratio of the solid angle $\Omega_B$ of the irradiating optical system to the solid angle of the hemisphere, namely:

$$k1 = \Omega_B / 2\pi \quad (11)$$

It must be expressed as follows:

$$k1 = \Omega_B / 2\pi - \Omega_B \quad (12)$$

since the radiation of the ambient falls only from the angular region $2\pi - \Omega_B$ onto the objects, but in most cases $2\pi >> \Omega_B$.

The intensity of the illumination at the edge of the field of view of the irradiating optical system is smaller than in its center. This influence is also taken into account by a correction factor k2 which averages the intensity over the viewing field.

Moreover, the solid angle $\Omega_{RB}$ with which the object "sees" the spectrometer optics is dependent upon the distance between the object and the spectrometer. Thus, a third correction value k3, takes this distance into account:

$$k3 = \Omega_{RB} = A_s / d^2 \quad (13)$$

wherein $A_s$ (cm$^2$) is the effective surface of the spectrometer aperture, and d (cm) is the distance from the spectrometer to the object.

The above three correction factors are contained in correction factor $\Omega_Q$, where:

$$\Omega_Q = k1 \cdot k2 \cdot k3 = k2 \cdot \Omega_B / 2\pi \cdot A_s / d^2 \quad (14)$$

with $0 < k2 < 1$.

Equations (7) to (10) are valid for the embodiment of FIG. 5, for measurements in the infrared region. Here, m radiation sources, for example, black bodies Q1–Qm are arranged in spectrometer housing (not shown), and the optical system, such as beam splitter QST, serves both to irradiate object O, and also for receiving radiation. The radiation of each source disposed opposite to radiation divider $_{QST_i}$ is reflected onto the object, back to telescope T, and passes together with the radiation emitted by object O and the ambient radiation reflected on it, back to radiation divider QST. Half of the incoming radiation is fed to interferometer-spectrometer IFS, and the other half is reflected from beam splitter QST to the respective radiation source wherein it is absorbed.

The embodiment of FIG. 5 has the advantage that radiation sources Q1–Qm are disposed in the spectrometer, and the object is irradiated through its optical system. However, here, the beam splitter transmits less energy onto the object and to the detector, than the embodiment of FIG. 7, and n further unknown quantities (if they are not supplied from other measurements) have to be determined, namely $n \times r_{QST_i} \Omega_Q$.

Measurements made in the infrared band are obtained from equations (7) to (10) and from the $(m+4n+2)$ unknowns. Since $(m+1) \cdot n$ measurements are taken, the following relationship must be fulfilled:

$m + 4n + 2 \leq (m+1) \cdot n$ $m + 3n + 2 \leq m \cdot n \quad (15)$ which can occur, for example, with m=4, or 4 radiation sources, and n=6, or 6 spectral ranges.

By flipping beam splitter QST off the radiation path, the respective measurement is obtained without irradiation, and $n \times r_i \cdot t_i$ additional unknowns have to be considered in the system. The measurement, without additional irradiation, is less suitable. The following is an illustration with numbers:

If all the measurements are performed with additional irradiation thus n·m measurements, then from equations (7) to (10), $(m+3n+2)$ unknowns are produced. The following relationship then has to be satisfied:

$m + 3n + 2 \leq m \cdot n \quad (15a)$ which occurs when there are 4 radiation sources in 6 spectral bands but with m instead of $(m+1)$ measurements. However, by switching off or screening the radiation sources (with an unchanged radiation path), a measurement is taken without irradiation. The following relationship has to be satisfied:

$$m+3n+2 \leq (m+1) \cdot n$$

$$m+2n+2 \leq m \cdot n \quad (16)$$

with m=3, or 3 radiation sources, and n=5, or 5 spectral ranges.

When all device parameters of FIG. 5 are known, aside from temperature $T_{Qi}$ of the additional irradiator (for example by a calibration), the number of unknowns is reduced as follows:

$$m \times T_{Qi}, n \times \epsilon_i, 1 \times T_{Obj} \text{ and } 1 \times T_{Amb}$$

and the following relationship has to be satisfied:

$$m+n+2 \leq (m+1) \cdot n$$

$$m+2 \leq m \cdot n \quad (16)$$

with m=1, or 1 additional radiation source, and n=3, or 3 spectral ranges.

In a second embodiment, the irradiation apparatus has its own telescope. The spectrometer and the irradiation unit can then be separate devices. They can also be assembled as one device. In either case, the entire surface covered by the spectrometer has to be radiated. Because beam splitter QST is absent, measurements without irradiation can be utilized in all spectral ranges.

In the general case, there are unknown:

$$m \times T_Q; n \times \lambda_i; n \times r_i \cdot t_i; 1 \times T_{Obj}; 1 \times T_{Amb} \text{ and } 1 \times \Omega_Q.$$

The following relationship has to be satisfied:

$$m+4n+2 \leq (m+1) \cdot n$$

$$m+3n+2 \leq m \cdot n \quad (15)$$

which is realized with m=2, 2 radiation sources, and n=5, 5 spectral ranges.

If a calibration is performed and a known factor $\Omega_Q$ is introduced, the same relationship as in the previous example is valid. The equation system is determined with one additional radiation source and n=3 spectral regions.

Examples of energy irradiation for a device corresponding to FIG. 5 are given with data of required irradiator temperature or expected radiation flux. The value of k3 from the equation (7) is set to:

$$k3 - \Omega_{RB} = A_s/d^2 = 1 \quad (19)$$

This holds true for the following example only when the distance d between the object and the spectrometer telescope is approximately 4-5 cm. If this distance is doubled, the reflected energy received is reduced to ¼.

The telescope of the device may have a primary mirror DP with a diameter of 5 cm, and a secondary mirror DS of 1 cm, with a focal length BW of 10 cm. The effective aperture $A_S$ of the spectrometer telescope is then:

$$A_S = \tfrac{1}{4}\pi(DP^2 - DS^2) \text{ [cm}^2\text{]}$$

$$A_S = 18.85 \text{ cm}^2. \quad (20)$$

When the field of view angle $\alpha_S = 5°$, then the solid angle $\Omega_S = 0.598 \times 10^{-2}$ sr, and the required detector or the irradiator surface (DF or SF) is:

$$\Omega_S = SF/BW^2 \text{ [sr]} \quad (21)$$

thus $SF = 0.598$ cm², whereby diameter SD of the irradiator is SD = 0.873 cm.

With the device, temperature $T_{Obj}$ of an object may be determined whose emissivity $\epsilon_{Obj} = 0.2$ (reflectivity $\rho_{Obj} = 0.8$) and which is located in an ambience with temperature $T_{Amb} = 300$ K. The object may have temperature $T_{Obj} = 360$ K.

At a wavelength of 8.5 μm, the radiation $L_{Obj}$ of the object is:

$$L_{Obj} = (0, 2.0, 246 \cdot 10^{-2} + 0, 8.0, 955 \cdot 10^{-3}) W/sr \cdot cm^3 \cdot \mu m$$

$$L_{Obj} = (0, 492 \cdot 10^{-2} + 0, 764 \cdot 10^{-3}) W/sr \cdot cm^2 \cdot \mu m$$

$$= 5, 684 \cdot 10^{-3} \; W/sr \cdot cm^2 \cdot \mu m$$

The radiation flux $P_{Obj}$ entering the above measuring device from the object is:

$$P_{Obj} = L_{Obj} \cdot A_S \cdot \Omega_s \text{ [W/}\mu\text{m]}$$

to $$P_{Obj} = 64.07 \cdot 10^{-5} \text{ W/}\mu\text{m}. \quad (22)$$

If black body Q1 used for irradiation has a temperature $T_{Q1} = 600$ K, its radiance $L_{Q1}$ at 8.5 μm is:

$$L_{Q1} = 0.17 \cdot 10^{-1} \text{ W/sr} \cdot \text{cm}^2 \cdot \mu\text{m}.$$

The radiation flux $P_{Q1}$ exiting through the optical system is computed as follows:

$$P_{Q1} = r_{QST} \cdot L_{Q1} \cdot SF \cdot \Omega_s \quad (23)$$

with $r_{QST} = 0.5$ thus $P = 3.04 \cdot 10^{-5}$ W/μm.

If one assumes that the radiation reflected by the object is completely received by the optical system, the radiation flux of this reflected part is:

$$P_{RQ1} = P_{Q1} \cdot \rho_{Obj}$$

to $$P_{RQ1} = 2.432 \cdot 10^{-5} \text{ W/}\mu\text{m};$$

which is approximately 3.7% of the entire radiation flux entering the device. The portion of the reflected radiation of the ambience amounts to 12.95% of the entire flux. When the above evaluations are used for a wavelength 4.0 μm with the identical parameters, then:

$$P_{Obj} = 18.51 \cdot 10^{-5} \text{ W/}\mu\text{m}$$

$$P_{Q1} = 5.26 \cdot 10^{-5} \text{ W/}\mu\text{m}$$

$$P_{RQ1} 4.20 \cdot 10^{-5} \text{ W/}\mu\text{m}$$

and the reflected radiation is approximately 18.5% of the entire radiation flux. The reflected ambient radiation amounts to 28.6%.

For a source temperature $T_{Q2} = 700$ K with otherwise unchanged parameters, this evaluation leads to the following values.

For a wavelength of 8.5 μm:

$$P_{Obj} = 64.07 \cdot 10^{-5} \text{ W/μm}$$

$$P_{RQ2} = 3.76 \cdot 10^{-5} \text{ W/μm} = 5.54\%,$$

the portion of the reflected ambient radiation amounts to 12.76%.

For a wavelength of 4.0 μm:

$$P_{Obj} = 18.51 \cdot 10^{-5} \text{ W/μm}$$

$$P_{RQ2} = 9.94 \cdot 10^{-5} \text{ W/μm} = 34.93\%$$

the portion of the reflected ambient radiation amounts to 22.87%.

The above presented examples show that the contributions of the different radiation sources (object, ambience, sources Q1–Qm) of the entire radiation flux have comparable values, and sources Q1–Qm supply sufficient energy for not very high temperatures $T_{Q1}$ to $T_{Qm}$.

From the above calculations, it should be noted that the emissivity (reflectivity) of the examined objects has a great influence upon the efficiency of the performed method. By reducing the reflectivity, the portion of the reflected source radiation becomes increasingly smaller and sometimes fades into noise. The requirement that the radiation of the source be reflected with a sufficient intensity can be satisfied either by increasing of intensity of the source, by increasing its temperature, or by changing the radiation geometry when the irradiation and measuring optical system is focused on the object. Then, the energy density of the irradiation is increased, and the object as viewed has a smaller surface element and thus the object radiation and reflected ambient radiation received is lower. A device can be built with both a fixed and a variable focal length.

Figure 6:
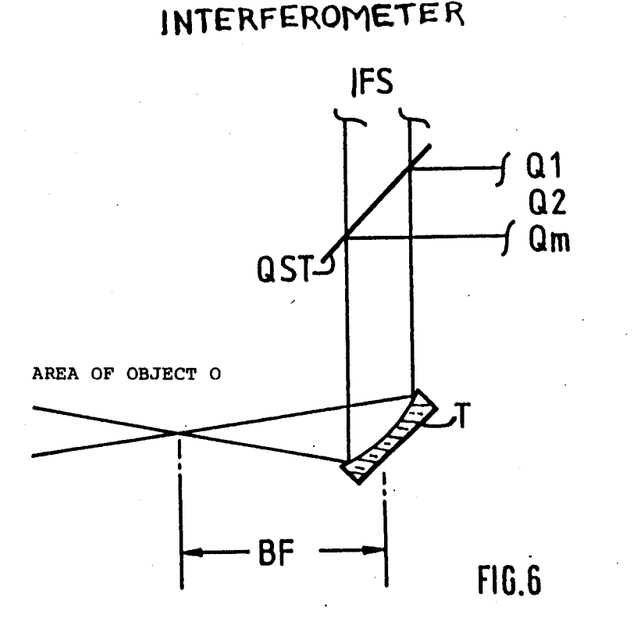
FIG. 6 is a schematic diagram showing a focussable optical system consisting of a beam splitter with a telescope.

FIG. 6 schematically shows a radiation path for the optical system that can be focused It can be seen that the amount of the reflected source energy depends little upon the distance between object O and the spectrometer. If this distance is greater than one focal length BF, the amount of radiation received from the object and of the reflected ambient radiation then becomes distance-dependent.

To overcome these difficulties, due to small reflected energies, lasers, laser diodes, and light-emitting diodes (LED) are used, since they irradiate high energy over small spectral bands. They can be pulsed with short time irradiation to avoid heating the object. The utilization of laser, laser diodes, and LED's is especially suitable for the apparatus of FIG. 5, in which the irradiation and measurement is performed with a common optical system using a relatively simple construction. When black bodies of higher temperatures are used, there is a greater expense for thermal insulation. Moreover, with lasers, laser diodes and LED's, it is possible to design a portable device due to their relatively low electrical energy consumption.

Several features utilizing LED'S, laser diodes and lasers, are illustrated hereinafter. Whereas with LED's, a fixed wavelength is emitted, laser diodes and lasers permit an adjustable or tunable wavelength. When such sources are used with fixed wavelengths, a diode or a laser is required for each wavelength. A total of n lasers or diodes Q1–Qn, as shown in FIG. 7 is required, whose apparatus corresponds to that shown in FIG. 5.

Figure 7:
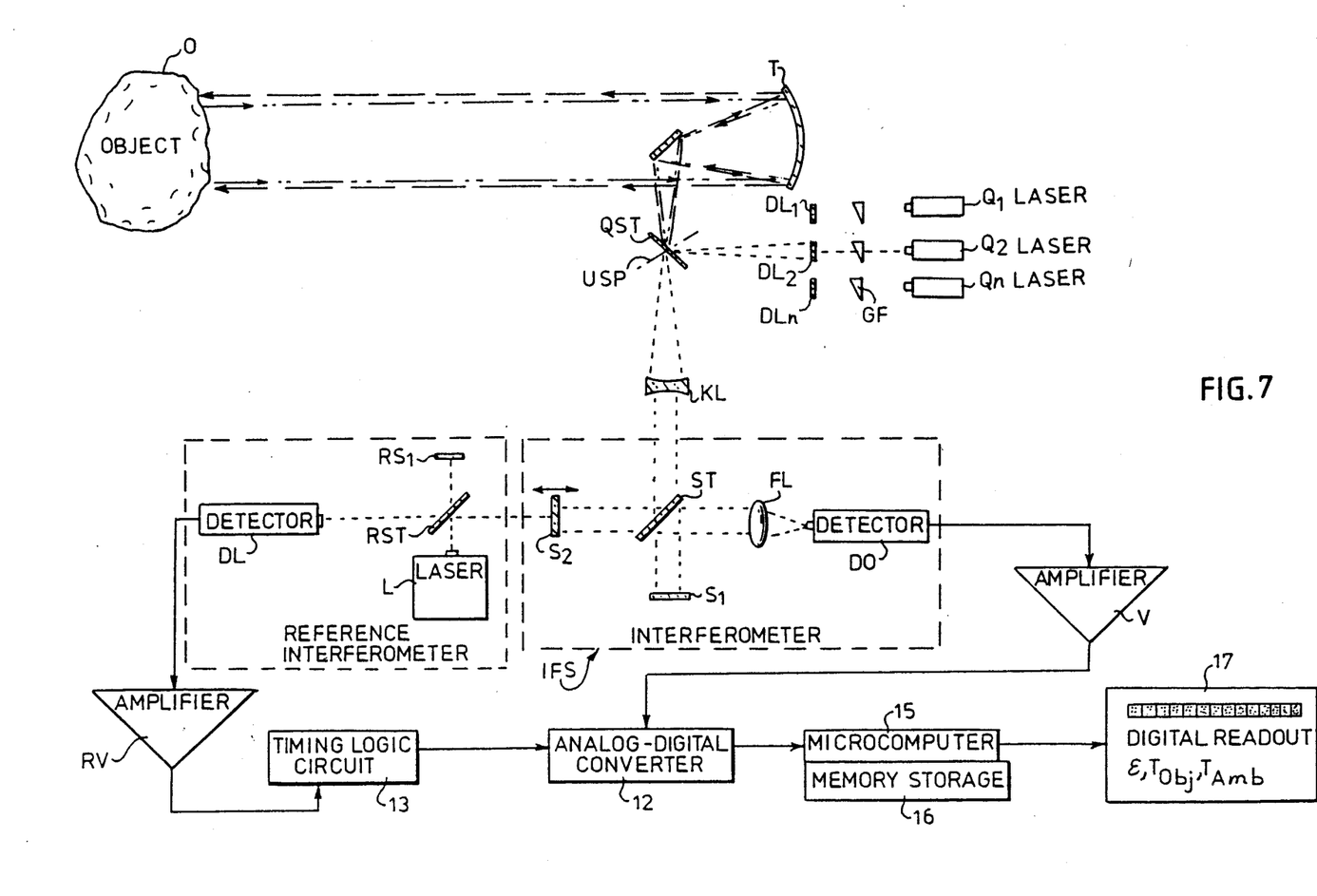
FIG. 7 is a schematic diagram of another embodiment showing an apparatus for measuring the temperature of an object with n radiation sources formed as laser diodes.

When only one tunable source is used, a great number of n different wavelengths can be used for measurement, particularly when the spectrometer is a continuously measuring Fourier spectrometer, such as the interferometer shown in FIG. 7. When the tunable wavelength region is not sufficiently great, two or more tunable sources must be used.

Laser and laser diodes emit a radiation in a spatially narrow and limited bundle. The objects should be irradiated over their entire surface covered by the field of view of the spectrometer. It must not be too narrow in space when using laser radiation. Commercial beam expanders installed prior to sources Q1–Qn in FIG. 7 provide for the desired diameter of the beam bundle. In many cases, it is sufficient to have, as shown in FIG. 7, simple diffusers DL1–DLn in the form of thick "Teflon" foils to expand the bundle.

In general, the optical bandwidth or the wavelength region of the laser or diodes is smaller than that of the measurement, and thus the respective wavelength range of the spectrometer. When the wavelength range of the spectrometer is designed so that the irradiation wavelengths lie substantially in the center of its measuring range, then the same reflectivity of the object can be assumed since the mean reflectivity of the object in a relatively wide measuring range is approximately equal to the reflectivity in the center of the range.

It should be noted that with LED's, laser diodes, and lasers, the Planck radiation law cannot be used for equations (7), (8), or (9). In other words, in the terms $r_{QST_r} \cdot \Omega_Q \cdot L_{TQ,\lambda i}$, the value $L_{TQ,\lambda i}$ cannot be computed in accordance with Planck. Moreover, a measured or earlier obtained calibration or known radiation intensity (at the respective wavelength) must be introduced. Its measurements can be performed with the embodiment of FIG. 7, so that through a mechanical system instead of beam splitter QST, a deviation mirror USP shown in broken lines is disposed in the radiation path so that it directs the radiation of sources Q1–Qn directly into the spectrometer. If the resulting radiation intensities are identified as $I_{L,\lambda i}$, then instead of value $L_{QT,\lambda i}$ in equations (7), (8), or (9), the following value must be present:

$$I_{L,\lambda i} \cdot 1/\tau_i$$

The changes of the radiation intensities to reach m different radiation intensities with n irradiation wavelengths can be obtained by using radiation damping elements such as, for example, a grey filter or grey wedge GF in FIG. 7, which is advantageously combined with a beam expander, such as diffusers DL1–DLn. The damping factor is introduced in the set of equations by measuring values $I_{L,\lambda i}$. When, in the embodiment of FIG. 7, all device components (for example by calibration), are known, then since values $I_{L,\lambda i}$ are measured, only $n \times \epsilon_i$, $T_O$ and $T_u$ are unknown. There are $(m+1) \cdot n$ measuring values thereagainst. Thereby, the following requirement is satisfied:

$$n + 2 \leq (m+1) \cdot n$$

$$2 \leq m \cdot n \quad (24A)$$

with m = 1. Thus, an operation with n laser sources or diodes, or with one tunable source with n wavelengths, with only one intensity (without changing the damping), determined the equation system with n = 2 wavelengths. The formation and processing of the redundantly determined equation system by utilizing the balancing computation provides especially accurate data. For the device shown in FIG. 5, with the above-mentioned conditions as in equation 24A, the freedom degree F or the number of redundantly determined measurements is as follows:

$$F = (m+1)n - (n+2) \quad (25)$$
$$= n - 2$$

Basically, all known lasers or diodes available on the market are suitable for this application. The following example is given hereinbelow:

Tunable lead salt laser diodes in the region 3 μm–30 μm wavelength with tunable ranges of 20 cm$^{-2}$ to 300 cm$^{-1}$ for different types;

Tunable $CO_2$ lasers in the range of 9 μm–11 μm;

Tunable krypton lasers in the range of 0.33 μm–0.799 μm;

Tunable dye lasers in the range of 0.19 μm–5 μm.

In all application cases, it is understood that the optical axes for receiving and irradiating are held normal to the object.

In accordance with the present invention, with unchanged quantities of the object and the ambient, measuring data for a determined or overdetermined equation system can be obtained A special advantage of the apparatus in accordance with the present invention is that it can determine a changing emissivity of the object with a constant object temperature. With changing object temperatures, one can detect the temperature dependency of the emissivity or of the object, in other words any change of the emissivity. With the use of diodes or lasers, portable devices can be designed at low cost.

Thus, while only a few embodiments of the present invention have been shown and described, it will be obvious that many changes and modification may be made thereunto, without departing from the spirit and scope of the invention.

What is claimed is:

1. An apparatus for optically measuring simultaneously the emissivity and temperature of an object by the consecutive determination of values of spectral radiance in n wavelengths regions in the ultra-violet, visible and infrared bands, comprising:

(a) radiation means having m(m>1) radiation sources Q1-Qm, and means (QST) for directing the radiation of a first radiation source (Q1) of said m radiation sources onto the object (O).

(b) measuring means for detecting via an optical system, the radiation reflected on the object (O) together with the radiation emitted from the object (O), and the ambient radiation reflected from the object (O) in n(n≧3) spectral bands;

(c) said means (QST) directing the radiation of a second radiation source (Q2) of said m radiation sources onto the object (O).

(d) said measuring means detecting via the same optical system, the radiation reflected on the object (O) together with the radiation emitted from the object (O) and the ambient radiation reflected from the object (O) in n(n≧3) spectral bands;

(e) said means (QST) directing successively the radiation of the third to m-th (Q3-Qm) radiation sources onto the object (O);

(f) said measuring means detecting via the same optical system each radiation reflected by the object (O) with the radiation emitted from the object (O) and each ambient radiation reflected from the object (O) in n(n≧3) spectral bands;

(g) said measuring means detecting via the same optical system the radiation emitted without additional radiation from the object (O) in n(n≧3) spectral bands;

(h) an analog-digital converter connected to said measuring means for converting n×(m+1) electrical signals produced during the steps (a) to (g) into digitized values, and (i) processing means connected to said converter for forming a set of n×(m+1) equations with the aid of the digitized values such that said values are expressed with the aid of Planck radiation law as the sum of the spectral radiance of radiation source with the temperature and the spectral emissivity $\epsilon_i$ of the object (O), the spectral radiance of a radiation source with the ambient temperature and the spectral radiance of a further irradiator with the temperature of said radiation sources (Q1-Qm) for irradiation of the object (O), wherein both latter values of spectral radiance are reflected on the object (O) with the spectral reflectivity $\rho_i = 1 - \epsilon_i$, and for actually determining from the set of equations by iterative solution, the temperature of the object (O), the ambient temperature and the temperature of one or several radiation sources (Q-1-Qm) and the value of the spectral emissivity of the object.

2. An apparatus for optically measuring simultaneously the emissivity and temperature of an object by consecutively determining the values of spectral radiance in n wavelength region in ultraviolet, visible and infrared bands, comprising:

a telescope for viewing the object;

a spectral measuring device optically coupled to the output of said telescope, said spectral measuring device including m(m>1) radiation sources (Q1-Qm), and a beam splitter located between the telescope and the spectral measuring device, through which consecutively, the radiation of one of the m radiation sources (Q1-Qm) is directed via the telescope onto the object, and, collecting through the same optical system the received radiation and directing the received radiation to the spectral measuring device;

an analog-to-digital converter electrically connected to said spectral measuring device; and, a timing logic circuit having a clock, said logic circuit having its input electrically connected to said spectral measuring device, and its output electrically connected to the analog-to-digital converter for producing clock pulses to said converter in response to said spectral measuring device; and, a microprocessor with a command input and indicator connected to said analog-to-digital converter.

3. The apparatus as defined in claim 1 or 2, wherein said radiation sources are lasers.

4. The apparatus as defined in claim 1 or 2, wherein said radiation sources are laser diodes.

5. The apparatus as defined in claim 1 or 2, wherein said radiation sources are light-emitting diodes, (LED's).

6. The apparatus as defined in claim 1 or 2, wherein said radiation source comprises a tunable laser for irradiation in the ultraviolet, visible and infrared wavelength bands.

7. The apparatus as defined in claim 1 or 2, wherein said radiation source comprises a tunable laser diode for irradiation in the ultraviolet, visible and infrared wavelength bands.

8. The apparatus as defined in claim 1 or 2, wherein said radiation source comprises tunable lasers for irradiation in the ultraviolet, visible and infrared wavelength bands, less than n relative to their wavelength.

9. The apparatus as defined in claim 1 or 2, comprising a beam expander for providing a homogenous illumination of the object associated with each radiation source (Q1–Q).

* * * * *